(No Model.)
W. H. BRAY.
DEVICE FOR PACKING GLASS GAGE TUBES.
No. 276,154. Patented Apr. 24, 1883.
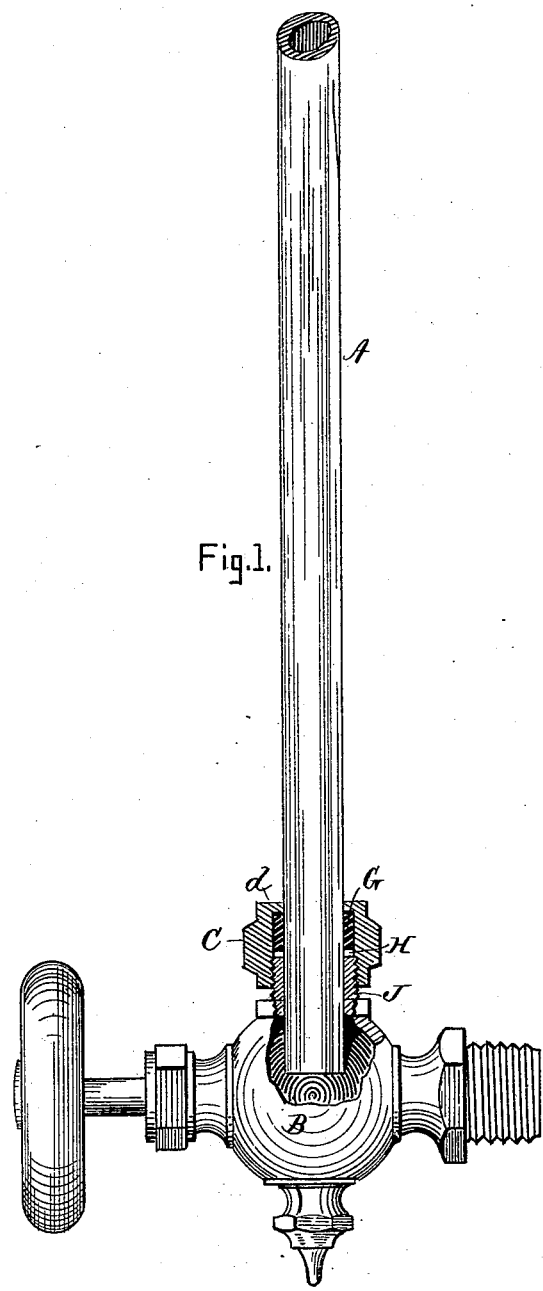
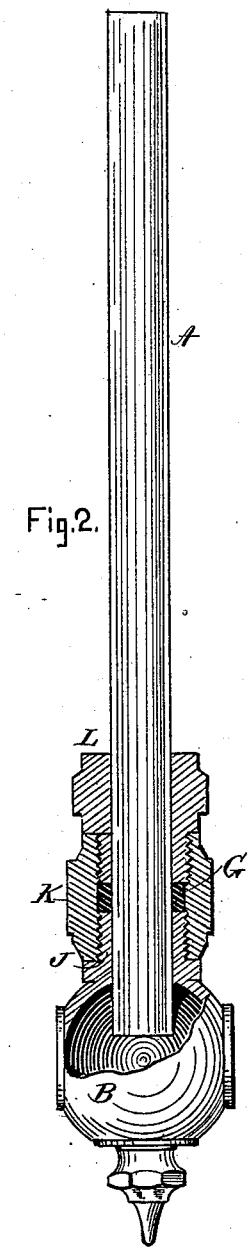
Witnesses:
Alfred Fawcett
H. E. Renwick
Inventor:
William H. Bray,
Per C. C. Shaw,
Atty.

UNITED STATES PATENT OFFICE.

WILLIAM H. BRAY, OF BOSTON, MASSACHUSETTS, ASSIGNOR OF ONE-HALF TO SAMUEL I. CRAFTS, OF SAME PLACE.

DEVICE FOR PACKING GLASS GAGE-TUBES.

SPECIFICATION forming part of Letters Patent No. 276,154, dated April 24, 1883.

Application filed December 18, 1882. (No model.)

*To all whom it may concern:*

Be it known that I, WILLIAM H. BRAY, of Boston, in the county of Suffolk, State of Massachusetts, have invented a certain new and useful Improvement in Water-Gages for Steam-Boilers, of which the following is a description, sufficiently full, clear, and exact to enable any person skilled in the art or science to which said invention appertains to make and use the same, reference being had to the accompanying drawings, forming a part of this specification, in which—

Figure 1 is a view representing a tube packed in the ordinary manner, and Fig. 2 a view showing my improved method of packing the same.

Like letters of reference indicate corresponding parts in the different figures of the drawings.

My invention relates more especially to that class of gage-tubes which are employed in connection with steam-boilers for showing the height of the water; and it consists in a novel construction and arrangement of the parts, as hereinafter more fully set forth and claimed, by which a more perfect joint is produced than can be obtained in the ordinary manner, and the tube prevented from breaking when removed to be cleaned, or when the nut is turned down to tighten the joint.

The nature and operation of the improvement will be readily understood by all conversant with such matters from the following explanation, its extreme simplicity rendering an elaborate description unnecessary.

In Fig. 1, A represents the tube, B the cock, and C the packing-nut, these parts being arranged in the ordinary manner. The nut is provided with an annular chamber, $d$, for the rubber packing-ring G, and with a thin metallic washer or follower, H, and is interiorly threaded to fit the nipple J, the tube passing through a hole in the top of the nut and through the packing-ring, follower, and nipple, as shown.

The objection to packing the tube, as described, or as shown in Fig. 1, is that the heat softens the rubber sufficiently to cause it to adhere to the tube, and also to the interior of the nut, and when the nut is turned back or unscrewed to remove the tube for cleaning, or is turned down to tighten the joint, the tube is liable to be broken.

My improvement is designed to obviate this objection, and to that end I make use of the means shown in Fig. 2, in which A is the tube; B, the cock; J, the nipple, and G, the rubber packing-ring. A gasket or interiorly-threaded sleeve, K, is screwed down onto the nipple J, the packing-ring being placed on top of the nipple and secured in position by the screw-plug L, the tube passing through the plug, ring, and nipple, as shown, so that when the plug is turned down a perfect joint will be formed and the tube tightly packed.

It will be obvious that the plug L and gasket K may be removed or the plug turned down to tighten the joint without breaking or endangering the tube, and that by dispensing with the follower H, placing the rubber packing directly on the nipple, and using the plug L and gasket K a more perfect joint is obtained than by the ordinary method of packing such tubes, in which the follower, instead of the packing, rests upon the nipple; also, that in repacking the tube, instead of removing the old packing-ring, as is necessary in the ordinary method, a new one may be placed on the old one, which may be allowed to remain, thus saving the trouble of removing the tube to detach the ring.

Having thus explained my invention, what I claim is—

A water-gage for steam-boilers, consisting of a cock or cocks, B, provided with a threaded nipple, J, a shouldered exteriorly-threaded screw-plug, L, an elastic gasket interposed between said plug and nipple, a sleeve, K, interiorly threaded at both ends, into which said plug and nipple enter, and a straight glass tube, A, which passes through said plug, gasket, and nipple into the bulb of the cock, substantially as described.

WILLIAM H. BRAY.

Witnesses:
C. A. SHAW,
H. E. METCALF.